(12) United States Patent
MacLaurin

(10) Patent No.: US 7,831,913 B2
(45) Date of Patent: Nov. 9, 2010

(54) SELECTION-BASED ITEM TAGGING

(75) Inventor: Matthew B. MacLaurin, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 442 days.

(21) Appl. No.: 11/193,586

(22) Filed: Jul. 29, 2005

(65) Prior Publication Data

US 2007/0028171 A1 Feb. 1, 2007

(51) Int. Cl.
*G06F 3/00* (2006.01)

(52) U.S. Cl. .................. 715/708; 715/705; 715/710; 715/816; 715/825; 715/968; 715/230; 715/231; 715/232; 715/233; 704/251; 706/12; 706/59; 706/934; 707/696; 707/740; 707/741

(58) Field of Classification Search .............. 715/705, 715/230–233, 708, 710, 816, 825, 968; 707/696, 707/736–747; 704/251; 706/12, 59, 934
See application file for complete search history.

(56) References Cited

U.S. PATENT DOCUMENTS

| | | | | |
|---|---|---|---|---|
| 5,309,359 A | * | 5/1994 | Katz et al. | 707/102 |
| 5,404,295 A | * | 4/1995 | Katz et al. | 707/2 |
| 5,422,984 A | * | 6/1995 | Iokibe et al. | 706/12 |
| 5,544,360 A | * | 8/1996 | Lewak et al. | 707/1 |
| 5,548,739 A | * | 8/1996 | Yung | 711/204 |
| 5,600,775 A | * | 2/1997 | King et al. | 715/203 |
| 5,685,003 A | * | 11/1997 | Peltonen et al. | 715/202 |
| 5,832,474 A | * | 11/1998 | Lopresti et al. | 707/2 |
| 5,835,959 A | * | 11/1998 | McCool et al. | 711/171 |
| 5,864,339 A | * | 1/1999 | Bedford-Roberts | 345/173 |
| 6,026,177 A | * | 2/2000 | Mong et al. | 382/156 |
| 6,044,365 A | * | 3/2000 | Cannon et al. | 707/2 |
| 6,169,983 B1 | * | 1/2001 | Chaudhuri et al. | 707/2 |
| 6,208,339 B1 | * | 3/2001 | Atlas et al. | 715/780 |
| 6,243,699 B1 | * | 6/2001 | Fish | 1/1 |
| 6,295,387 B1 | * | 9/2001 | Burch | 382/311 |
| 6,297,824 B1 | * | 10/2001 | Hearst et al. | 715/848 |
| 6,356,891 B1 | * | 3/2002 | Agrawal et al. | 707/2 |
| 6,377,965 B1 | * | 4/2002 | Hachamovitch et al. | 715/203 |
| 6,408,301 B1 | * | 6/2002 | Patton et al. | 707/741 |
| 6,496,828 B1 | * | 12/2002 | Cochrane et al. | 707/10 |
| 6,519,603 B1 | * | 2/2003 | Bays et al. | 707/102 |
| 6,711,585 B1 | * | 3/2004 | Copperman et al. | 707/104.1 |
| 6,731,312 B2 | * | 5/2004 | Robbin | 715/792 |
| 6,751,600 B1 | * | 6/2004 | Wolin | 706/12 |
| 6,757,692 B1 | * | 6/2004 | Davis et al. | 707/692 |

(Continued)

*Primary Examiner*—Weilun Lo
*Assistant Examiner*—Eric Wiener
(74) *Attorney, Agent, or Firm*—Wolf, Greenfield & Sacks, P.C.

(57) ABSTRACT

Item selections along with user inputs are leveraged to provide users with automated item tagging. Further user interaction with additional windows and other interfacing techniques are not required to tag the item. In one example, a user selects items and begins typing a tag which is automatically associated with the selected items without further user action. Tagging suggestions can also be supplied based on a user's selection, be dynamically supplied based on a user's input action, and/or be formulated automatically based on user data and/or tags and the like associated with selections by an external source. Machine learning can also be utilized to facilitate in tag determination. This increases the value of the tagged items by providing greater item access flexibility and allowing multiple associations (or tags) with each item.

20 Claims, 13 Drawing Sheets

U.S. PATENT DOCUMENTS

| | | | |
|---|---|---|---|
| 6,766,069 B1 * | 7/2004 | Dance et al. | 382/309 |
| 6,795,094 B1 * | 9/2004 | Watanabe et al. | 715/762 |
| 6,810,149 B1 * | 10/2004 | Squilla et al. | 382/224 |
| 6,810,272 B2 * | 10/2004 | Kraft et al. | 455/566 |
| 6,820,094 B1 * | 11/2004 | Ferguson et al. | 707/200 |
| 6,826,566 B2 * | 11/2004 | Lewak et al. | 707/4 |
| 6,898,586 B1 * | 5/2005 | Hlava et al. | 1/1 |
| 7,010,751 B2 * | 3/2006 | Shneiderman | 715/232 |
| 7,013,307 B2 * | 3/2006 | Bays et al. | 707/102 |
| 7,032,174 B2 * | 4/2006 | Montero et al. | 715/257 |
| 7,051,277 B2 * | 5/2006 | Kephart et al. | 715/229 |
| 7,275,063 B2 * | 9/2007 | Horn | 1/1 |
| 7,293,231 B1 * | 11/2007 | Gunn et al. | 345/179 |
| 7,392,477 B2 * | 6/2008 | Plastina et al. | 715/764 |
| 7,395,089 B1 * | 7/2008 | Hawkins et al. | 455/556.1 |
| 7,401,064 B1 * | 7/2008 | Arone et al. | 1/1 |
| 7,437,005 B2 * | 10/2008 | Drucker et al. | 382/224 |
| 7,506,254 B2 * | 3/2009 | Franz | 715/259 |
| 7,587,101 B1 * | 9/2009 | Bourdev | 382/291 |
| 2002/0016798 A1 * | 2/2002 | Sakai et al. | 707/517 |
| 2002/0069218 A1 * | 6/2002 | Sull et al. | 707/501.1 |
| 2002/0107829 A1 * | 8/2002 | Sigurjonsson et al. | 707/1 |
| 2002/0152216 A1 * | 10/2002 | Bouthors | 707/10 |
| 2003/0120673 A1 * | 6/2003 | Ashby et al. | 707/100 |
| 2003/0172357 A1 * | 9/2003 | Kao et al. | 715/529 |
| 2004/0039988 A1 * | 2/2004 | Lee et al. | 715/505 |
| 2004/0083191 A1 * | 4/2004 | Ronnewinkel et al. | 706/20 |
| 2004/0123233 A1 * | 6/2004 | Cleary et al. | 715/513 |
| 2004/0172593 A1 * | 9/2004 | Wong et al. | 715/512 |
| 2004/0199494 A1 * | 10/2004 | Bhatt | 707/3 |
| 2005/0033803 A1 * | 2/2005 | Vleet et al. | 709/203 |
| 2005/0114357 A1 * | 5/2005 | Chengalvarayan et al. | 707/100 |
| 2005/0132079 A1 * | 6/2005 | Iglesia et al. | 709/230 |
| 2005/0192924 A1 * | 9/2005 | Drucker et al. | 707/1 |
| 2005/0262081 A1 * | 11/2005 | Newman | 707/9 |
| 2006/0031263 A1 * | 2/2006 | Arrouye et al. | 707/200 |
| 2006/0224959 A1 * | 10/2006 | McGuire et al. | 715/700 |

* cited by examiner

SELECTION-BASED ITEM TAGGING

BACKGROUND

With the proliferation of computing devices has come a dramatic increase in available information that seems to be exponentially growing each year. This requires that storage technology keep pace with the growing demand for data storage. Vast amounts of data can now be stored on very small devices that are easily transported and accessible almost anywhere in the world via the Internet. Data retrieval techniques have expanded in scale to also meet the growth of stored data. Advances in search engines and other 'data mining' techniques facilitate in the extraction of relevant data. Easy retrieval of information is paramount in the utilization of stored data. The harder the data is to retrieve, the more likely it will not be accessed and utilized. On the far end of the retrieval spectrum, if the data cannot be found and retrieved at all, then technology has failed despite the ability to store the data. Its value will lie dormant until technology once again advances to allow full access to the data.

Frequently, it is the timeliness of the information that makes its value substantial. The value of retrieving information at a desired point in time can be profound. A doctor operating on a patient may need access to additional surgical procedures or patient information during the surgery—making information retrieval a possible life and death action at that moment. Although this is an extreme example, it shows that the patient information, such as allergies to medicines, may be of a much lesser value to the doctor after the surgery should the patient die on the operating table due to an allergic reaction. Thus, having vast amounts of data is of little value if the data is not organized in some fashion to allow its retrieval. Therefore, data storage techniques such as databases utilize various methods to store the data so that it can be retrieved easily. Database search engines also utilize different techniques to facilitate in increasing the speed of data retrieval.

Most people familiar with an office environment will readily recognize an office filing cabinet. It typically has four or five drawers that contain paper files that are stored in folders inside the cabinet. This office concept of organizing was carried over into the computer realm in order to more easily transition new users to computer technology. Thus, typically, computer files are stored in folders on a computer's hard drive. Computer users organize their files by placing related files in a single folder. Eventually, this too became unwieldy because a folder might have several hundred or even a thousand files. So, users began to use a hierarchy of folders or folders-within-folders to further breakdown the files for easier retrieval. This aided retrieval but also required users to "dig" deeply into the folders to extract the folder with the desired information. This was frequently a daunting task if there were large hierarchies of folders.

The folder concept, however, is often challenged by those users who do not agree that an item only belongs to a single folder. They frequently desire to associate a file with several folders to make it easier to find. Some just copy a file into different folders to alleviate the problem. That, however, uses more storage space and, thus, is not highly desirable for large quantities of information. To circumvent this, users have begun to "mark" or "tag" the files or data to indicate an association rather than placing them in a folder. A tag is generally an arbitrary text string associated with an item that is utilized to recall that item at a later time. By tagging the item, the user is not required to place it in a folder and force it into a single category. A user has the flexibility of tagging and, thus, associating different types of items such as graphics, text, and/or data and the like. It also allows a user to apply multiple tags to the same item. Thus, a user can tag a picture of a mountain as a 'vacation picture' to enable recalling it as a vacation photo and also as 'desktop wallpaper' to enable recalling it as a background image on a computer screen. This is accomplished without requiring the actual item to be moved or placed into a folder, etc.

Despite the apparent power and flexibility afforded by tagging in contrast to utilizing folders, the folder concept still dominates most of today's computer users. The folder concept is easy to understand and to implement. It is "intuitive" for those who work or have worked in office environments and only requires a user to drag and drop an item into a folder to associate it with other items. In sharp contrast, current tagging techniques are cumbersome and require a user to dig deeply into associated data of the item, typically requiring opening several computer windows and having 'expert-like' knowledge in order to correctly tag the item. For these reasons, tagging has not been well received by most users, despite its powerful potential. To overcome a user's unwillingness to utilize complicated implementation procedures, tagging has to be as intuitive and easy as the folder concept. Only then will users begin to embrace tagging as a replacement for the filing concept that originated from the traditional office environment.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

The subject matter relates generally to information retrieval, and more particularly to systems and methods for tagging items based on user selections of items. The item selections along with user inputs are leveraged to provide users with automated item tagging with minimal impact to the user, allowing easy recall of the tagged items at another time. Further user interaction with additional windows and other interfacing techniques are not required to save the tag with the item. Thus, for example, the user can select items and begin typing a tag which is automatically associated with the selected items. In other instances, tagging suggestions can be supplied based on a user's selection. For example, if the items selected are known to be dog related, a tag of "dog" can be suggested to the user based on the selection of the dog related items. In another instance, tagging suggestions can be dynamically supplied based on a user's input action. For example, if a user types "gr," a tag of "graphics" can be suggested to the user. Tagging suggestions can also be formulated automatically based on user data and/or tags and the like associated with selections by an external source. For example, if a user is determined to be a doctor, medical related terminology tag sets can be downloaded from the Internet and included in the supplied tag suggestions. Thus, the systems and methods herein provide an extremely convenient manner in which to add tags to items and can, if desired, employ machine learning to facilitate tag determination. This increases the value of the tagged items by providing greater item access flexibility and allowing multiple associations (or tags) with each item.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

Figure 1:
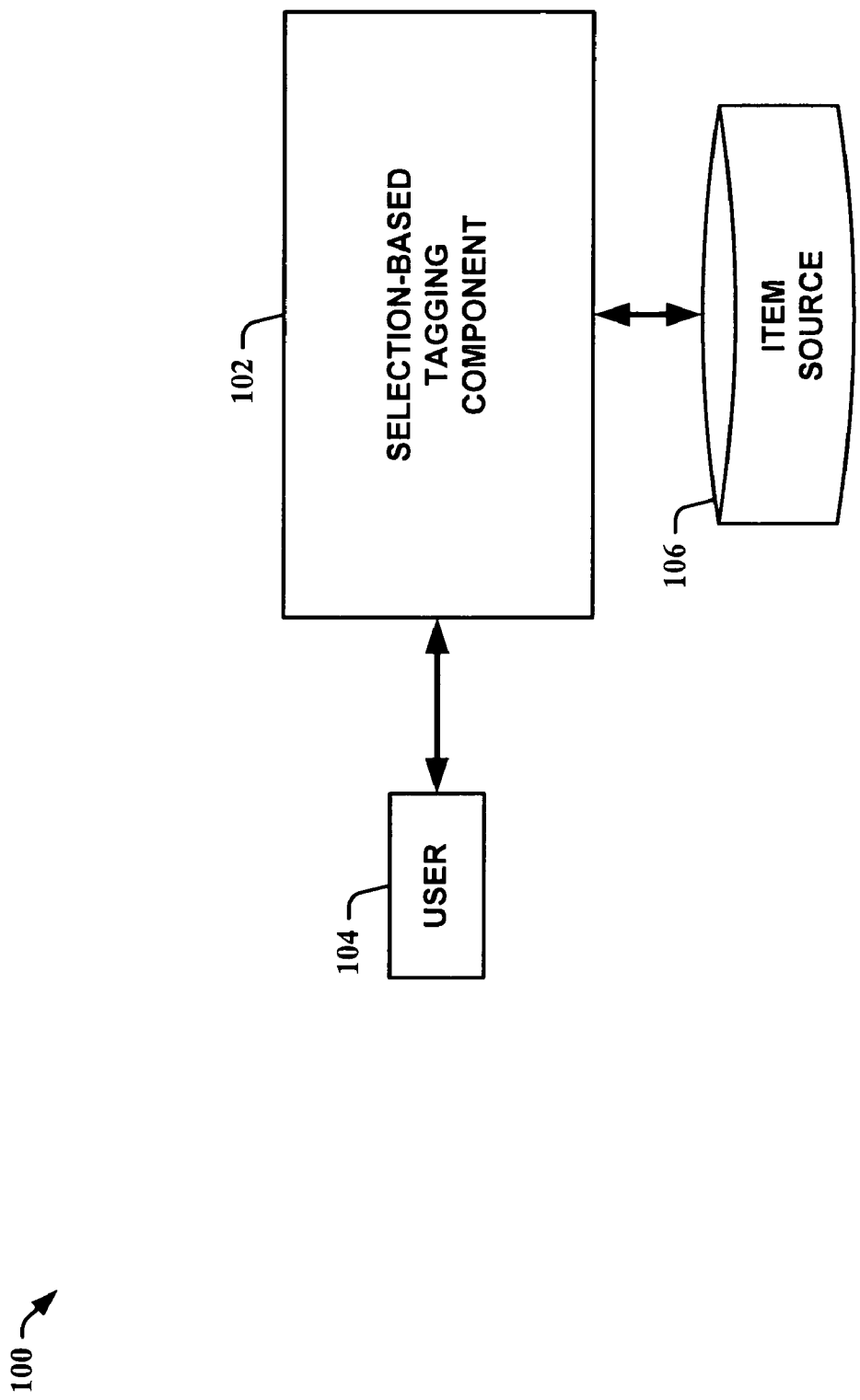
FIG. 1 is a block diagram of a selection-based tagging system in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

Ad-hoc item tags are simple text-based strings that are a useful form of organization for end users. Existing systems today that apply tags require cumbersome dialog boxes and/or menus that interrupt the user's thought process and work flow. The systems and methods herein provide an improved user interface for applying tags automatically when the user has made a selection of items to be tagged and/or provides an input such as, for example, typing any character on a keyboard. Tags can be added to items without entering a complex mode and/or substantially interrupting current activity. The type of tag that the user is typing is determined based on factors that can include the item selected, other tags applied to similar items and/or used recently, and/or the most commonly used tags and the like. In one instance, if the user has selected one or more items and begins to type, tagging mode is entered automatically and a tag buffer collects key strokes to facilitate determination of the tag type.

In FIG. 1, a block diagram of a selection-based tagging system 100 in accordance with an aspect of an embodiment is shown. The selection-based tagging system 100 is comprised of a selection-based tagging component 102 that interfaces with a user 104 and an item source 106. The selection-based tagging component 102 interacts with the user 104 and provides a means for the user 104 to select items from the item source 106. When a selection is detected by the selection-based tagging component 102, it 102 provides the user with a suggested tag for that selection. In other instances, the selection-based tagging component 102 can wait for the user 104 to provide an input subsequent and/or prior (if associated with the subsequent selection) to the selection before the selection-based tagging component 102 responds with a suggested tag. In that scenario, the selection-based tagging component 102 can respond dynamically to the user's input and relay tag suggestions as the user 104 provides inputs. For example, the selection-based tagging component 102 can respond with tag suggestions that utilize each character that the user 104 types into a keyboard, providing a list of tag suggestions that utilize at least some of the typed characters. The selection-based tagging component 102 can also provide tag suggestions by heuristically determining the tag based on a selected item, a tag associated with a similar item, a recently utilized tag, a commonly used tag, a rule-based criterion, and/or a heuristic-based criterion. The input provided by the user 104 can be a mouse click, a keyboard keystroke as mentioned, a visual indicator (e.g., eye scanning techniques that determine where and at what a user is looking), and/or an audible indicator (e.g., verbal commands and the like to instruct a computing device what to select, what to input, and what choices to select, etc.). The item source 106 can be a local and/or remote depository of data and the like. Typically, databases are utilized for information storage and retrieval. The tags provided by the user 104 and generated by the selection-based tagging component 102 can be stored with the associated data in the item source 106 if desired. Tags can also be associated on newly created data not yet stored in the item source 106.

Figure 2:
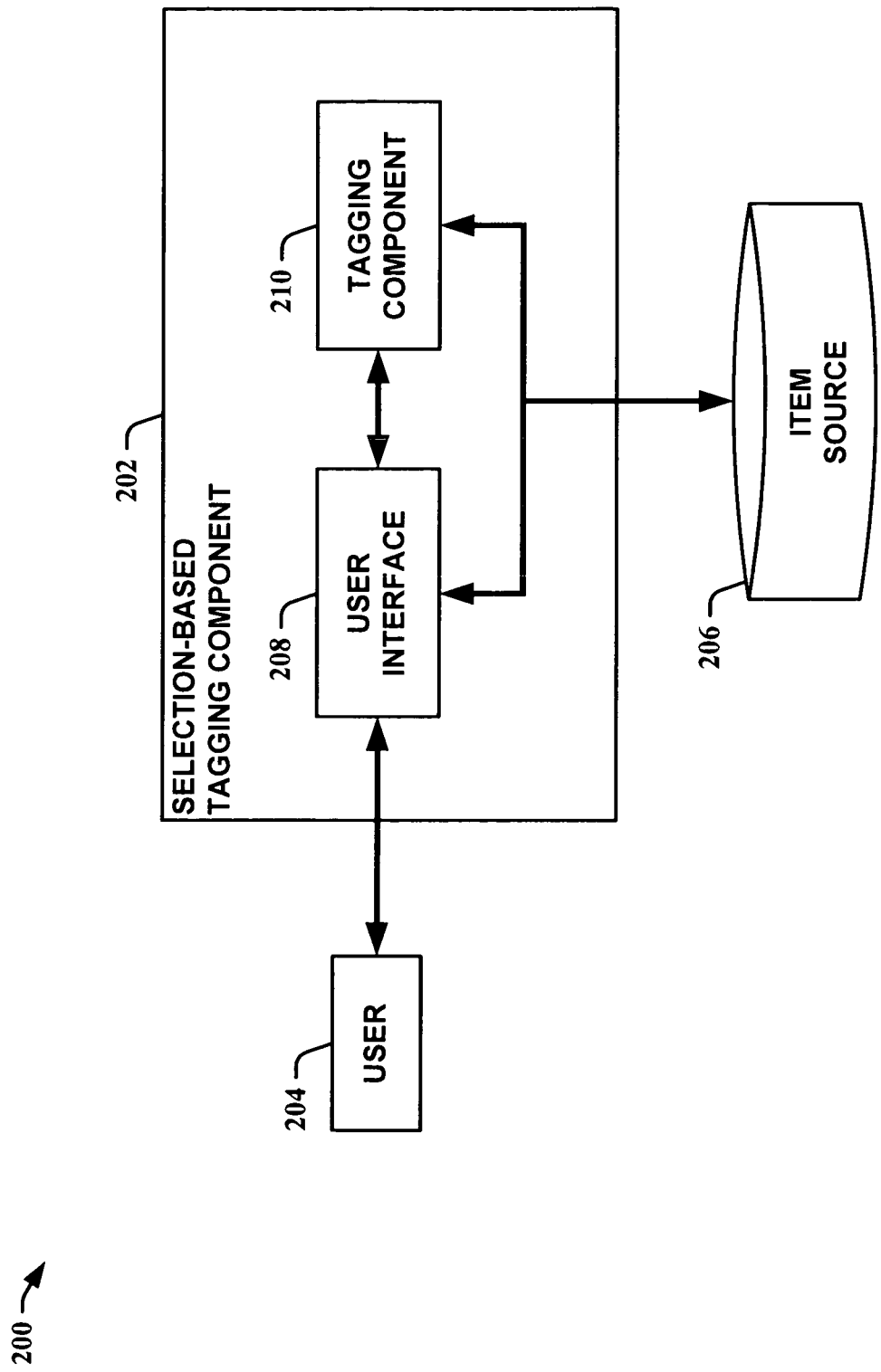
FIG. 2 is another block diagram of a selection-based tagging system in accordance with an aspect of an embodiment.

Turning to FIG. 2, another block diagram of a selection-based tagging system 200 in accordance with an aspect of an embodiment is illustrated. The selection-based tagging system 200 is comprised of a selection-based tagging component 202 that interfaces with a user 204 and an item source 206. The selection-based tagging component 202 is comprised of a user interface 208 and a tagging component 210. The user interface 208 provides the user 204 with a means to view and/or select items from the item source 206. The user 204 can obtain tag suggestions for item selections from the tagging component 210 via the user interface 208. The user 204 can also input tags for a selection of items to the tagging component 210 via the user interface 208. The tagging component 210 can also access the item source 206 to locate additional tag information, like tags, other associated tags, and/or other associated items and the like to facilitate tag determinations and/or storage. When the user 204 selects at least one item via the user interface 208, the tagging component 210 determines a suggested tag based on, in part, the selected item itself. It 210 can look for other similar tags that are related to the item and provide those as suggestions. It 210 can also suggest commonly used tags, most recently used tags, and/or tags based on user data such as, for example, preferences, profession, work topic (e.g., a graphics designer working on a project is most likely working on 'graphics,' etc.), and/or activity and the like.

The tagging component 210 can also utilize the user interface 208 to detect when the user 204 is providing an input such as a keystroke and/or mouse click and the like (described supra). This input which is subsequent and/or prior to the selection of the item or items allows the tagging component 210 to attempt guesses for possible tag suggestions for the user 204. For example, if the user 204 inputs a "g," the tagging component 210 can list possible tags that begin with the letter "g" such as, for example, "graphics," "group A," "group B." "green," and/or "garage" and the like. As the user 204 types more characters (i.e., inputs), the tagging component 210 dynamically responds by providing tag suggestions that can mimic the characters disclosed up to that point. In a similar fashion, if the tagging component 210 recognizes a sequence of characters that has associations other than based directly on the characters, it 210 can display those tag suggestions as well. For example, the user 204 can type "hom" for home and the tagging component 210 can respond with a tag suggestion that was previously used by the user 204 and/or synonymous such as "house" and the like.

Figure 3:
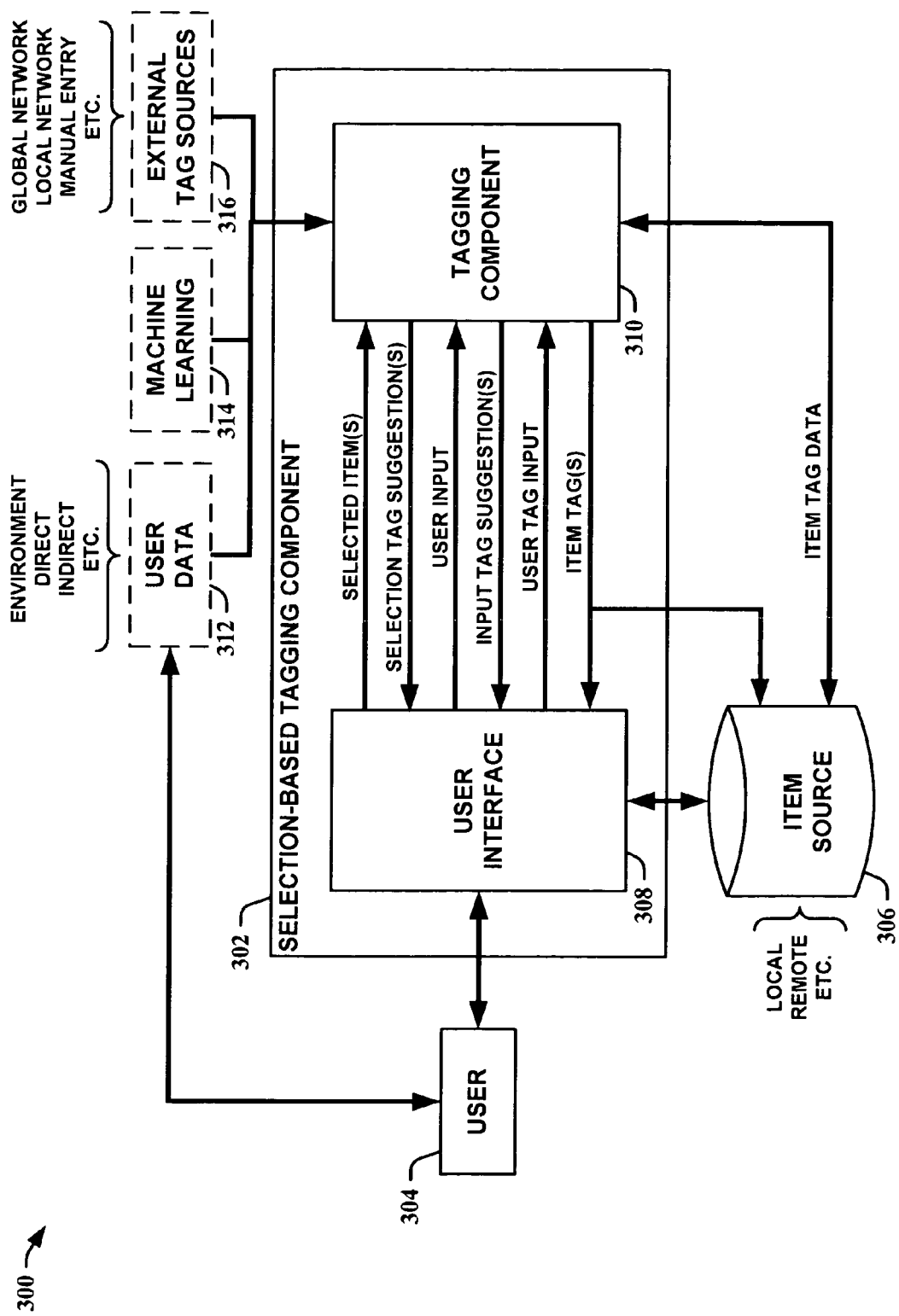
FIG. 3 is yet another block diagram of a selection-based tagging system in accordance with an aspect of an embodiment.

Looking at FIG. 3, yet another block diagram of a selection-based tagging system 300 in accordance with an aspect of an embodiment is depicted. The selection-based tagging system 300 is comprised of a selection-based tagging component 302 that interfaces with a user 304, an item source 306, optional user data 312, optional machine learning 314, and optional external tag sources 316. The selection-based tagging component 302 is comprised of a user interface 308 and a tagging component 310. The user interface 308 interacts with the user 304 to receive and/or provide information related to items from the item source 306. The item source 306 can be local and/or remote to the interface and/or the selection-based tagging component 302. In a typical interaction, the user interface 308 detects a selection of at least one item by the user 304. The information relating to what items are selected is passed to the tagging component 310. The tagging component 310 determines at least one tag suggestion based on various parameters and/or data. The user 304 can then respond by selecting a suggested tag and/or the user 304 can provide a user input such as, for example, by typing on a keyboard various characters and the like. The user input obtained by the tagging component 310 via the user interface 308 is utilized to form additional tag suggestions for relaying to the user 304 via the user interface 308. The input based tag suggestions are then utilized by the user 304 to make a tag selection and/or the user 304 can directly input a different tag altogether. The selected and/or direct input tag is then obtained by the tagging component 310 and utilized to tag the selected items. The utilized tags are then relayed to the user via the user interface 308 at appropriate times to facilitate the user 304 in recalling items based on tag information. The tagging component 310 can also directly store the tags with the selected items in the item source 306 if desired.

The tagging component 310 can also heuristically determine the tag based on a selected item, a tag associated with a similar item, a recently utilized tag, a commonly used tag, a rule-based criterion, and/or a heuristic-based criterion. Optional machine learning 314 can also be employed to learn tag suggestions. Optional user data 312 (e.g., user environment data, directly entered by the user 304 data, and/or indirectly derived data and the like) can also be utilized by the tagging component 310 to determine tag suggestions. The tagging component 310 is not limited to only utilizing internally obtained and/or local information. Optional external tag sources 316 (e.g., global network connections, local network connections, and/or manually entered data and the like) can also be employed to provide additional information to facilitate tag suggestions. For example, if the user 304 is determined to be a lawyer (determined from the optional user data 312), the tagging component 310 can obtain tag information related to attorneys via the Internet. The Internet obtained attorney tag list can then be utilized to facilitate in formulating tag suggestions that are more appropriate for that particular user. Optional machine learning 314 can also be employed, in this example, to account for the likelihood that one tag suggestion is better than another. One skilled in the art will appreciate the power and flexibility achievable utilizing the systems and methods described herein over traditional manually entered tags that required a user to 'dig deeply' into file parameters to set tags. Thus, this technology allows the user 304 to just select and type/choose a tag and move on to other work without breaking their concentration.

Simple text-based strings or tags are a very useful form of organization for users. They allow a variety of items to be easily recalled later utilizing only a single tag. The tag itself is free-form—there is no interpretation of the tag by the computing device. Utilization of tagging has several advantages over traditional folder systems. For one, tagged items can be stored on separate computing devices in different locations. If the computing devices are connected in some manner, retrieval of the items using the tags can be achieved easily. Thus, the retrieval of tagged information is independent of where the items are stored. This is a substantial benefit to users who frequently employ multiple computing devices and/or users who have portable computing devices and require easy synchronization of files between devices. Tagging also excels in allowing items to have multiple tags. That is, an item can belong to multiple groups and associations without requiring the item to be moved or copied into many different locations, saving storage space and increasing the value of the item through increased utilization. Tagging is also beneficial for data mining. It allows a system to glean additional knowledge from the tags and also their associations with items that would otherwise not be obtainable. For example, to a computer system, a picture is a grouping of pixels. The computer system cannot necessarily interpret the true meaning or value of the picture. With tags, however, dates, people, places, and times can be tagged to the picture allowing the computer system to gain more knowledge regarding what the picture represents to the user.

Despite the great virtues of tags, existing systems which allow users to apply tags, however, require cumbersome dialog boxes and/or menus which interrupt the user's thought process and work flow. As a result, these systems have failed to encourage users to use tags regularly, effectively limiting the success of tags as an organizational construct in desktop computer systems. In sharp contrast, the systems and methods herein make tagging more natural, less interruptive, easier, and more approachable for end users. Users can add tags to items without entering a complex mode and/or substantially interrupting their current activity.

Tags can be applied without opening a dialog box, menu, and/or other selection user interface. This allows smooth transitions to tagging and back to other work. The tags can be applied automatically when a user has made a selection of items to be tagged and/or types any character at a keyboard. Tag suggestions can be obtained by heuristically guessing which tag a user is typing based on, for example, the item selected, other tags applied to similar items, other tags that have been used recently, most commonly used tags, and/or any other rule-based and/or heuristic criteria and the like. For example, if a user is looking for a house, they may tag items with "house" during the day. On the next day, the same user may have forgotten the previous day's tag and start to tag items with "home." Thus, at the moment the user is applying tags, they can be reminded that they previously used "house" instead of "home," saving them from utilizing multiple tags when they did not intend to do so. In this manner, users are reminded of similar tags by automatically and dynamically providing a list of tags that start with the same characters. Moreover, the similarity process can be extended to include similar items rather than just similar tags. So, if a user previously tagged a word processing document with a particular tag, the next word processing document they attempt to tag can prompt a display of the previous document's tag.

Tagging systems can also utilize tag reconciliation. Tag sets from multiple users can be compared and adjusted, improved, and/or added to another tag set and the like. In a similar manner, tags can be mapped to formal taxonomies. For example, if a user is a doctor and a tagging system notices that the user is tagging with terms akin to the medical profession, the tagging system can go to, for example, an online service and retrieve a medical profession tag set and/or upload the user's tag set (with the user's permission). This allows the tagging system, for example, to download all commonly used tags for doctors and to provide relevant tag suggestions to the user.

The tagging system can contain both automatic tags generated by the tagging system and explicit tags from a user. By distinguishing between the two types of tags easily, a user can be alerted to their confidence level with regard to the tags. A user may have high confidence in their explicit tags and lesser confidence in system generated tags. Users may also desire to make system tags their own by accepting them via a user interface mechanism. Thus, users may locate documents, for example, without totally agreeing or disagreeing with the tags associated with those documents. If they decide that the system tags are to their liking, they can change them to explicit tags. By doing so, the tagging system can learn from the changes and even employ machine learning techniques to facilitate in providing better tag suggestions. Both agreeing with a system generated tag and disagreeing with a system generated tag, can be utilized to increase the "intelligence" of the tagging system. Likewise, taking no action can also be employed in the learning process.

As an example user interface, given a display of items, such as the list of files presented in a desktop file window, if the user has selected one or more items utilizing the user interface and begins to type, a light 'tagging mode' can be entered with the following characteristics:

display a special icon and/or text message indicating that tagging is active accumulate each key a user types into a "tag buffer"

use this tag buffer to guess at likely tags display the current "best guess" tag in a textual readout associated with the window allow a user to choose between "tag guesses" using cursor arrows allow a user to choose whether to accept guesses or simply use the buffer as is if a user hits the escape key (or similar), exit tagging mode if the user hits the enter/return key (or similar), apply the items to the tag In addition, if an automated tag and an explicit tag (one entered by a user) are both presented to the user, each type of tag can be distinguished utilizing different sizes, fonts, colors, and/or symbols and the like. The above user interface characteristics are meant to be a representative process and one skilled in the art can appreciate that many variations are possible and are still within the scope of the disclosed subject matter herein. In general, once the tags are applied to the selected items, they are automatically utilized by the system to organize and retrieve content.

Figure 4:
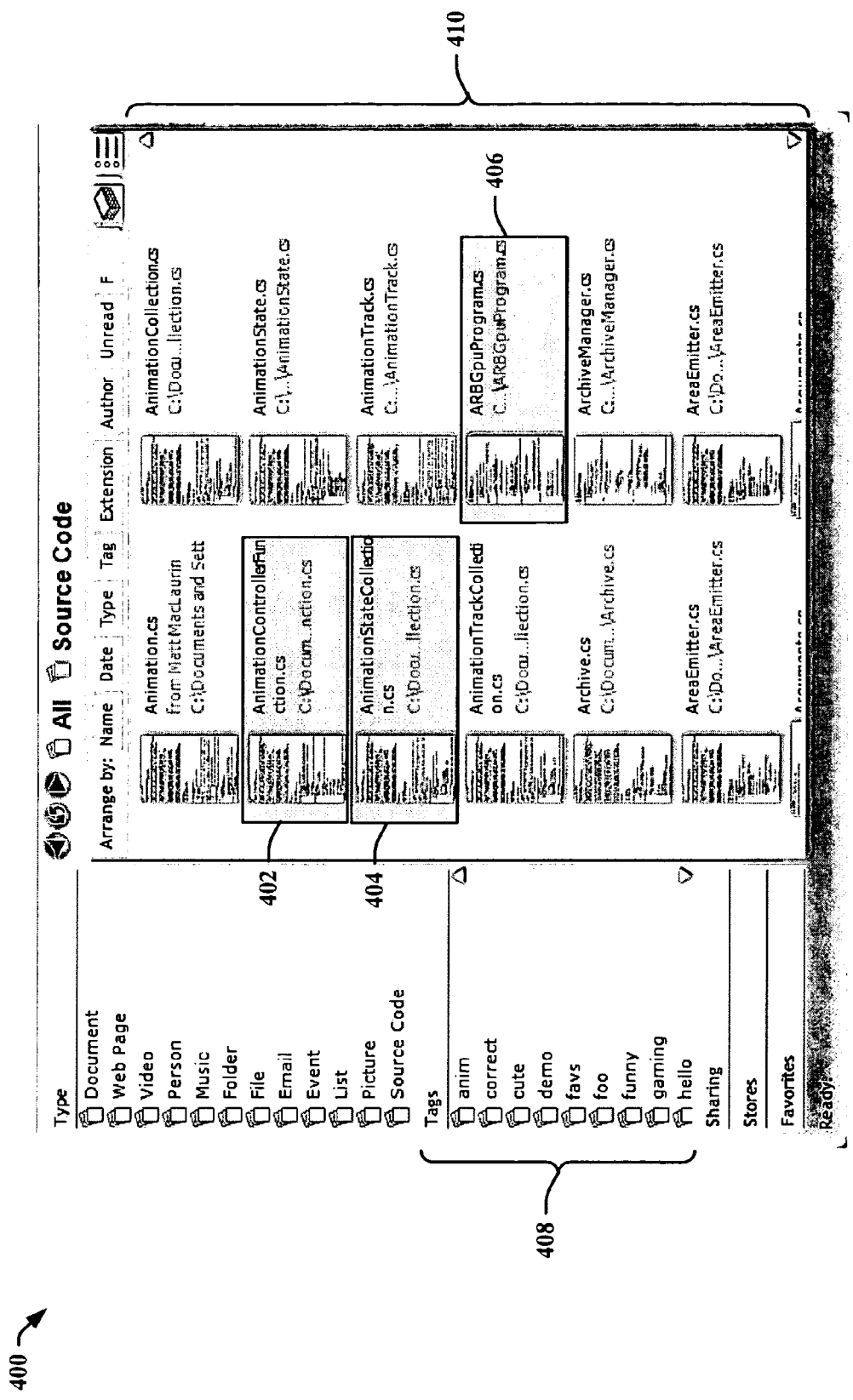
FIG. 4 is an illustration of a user interface with selected items in accordance with an aspect of an embodiment.
Figure 5:
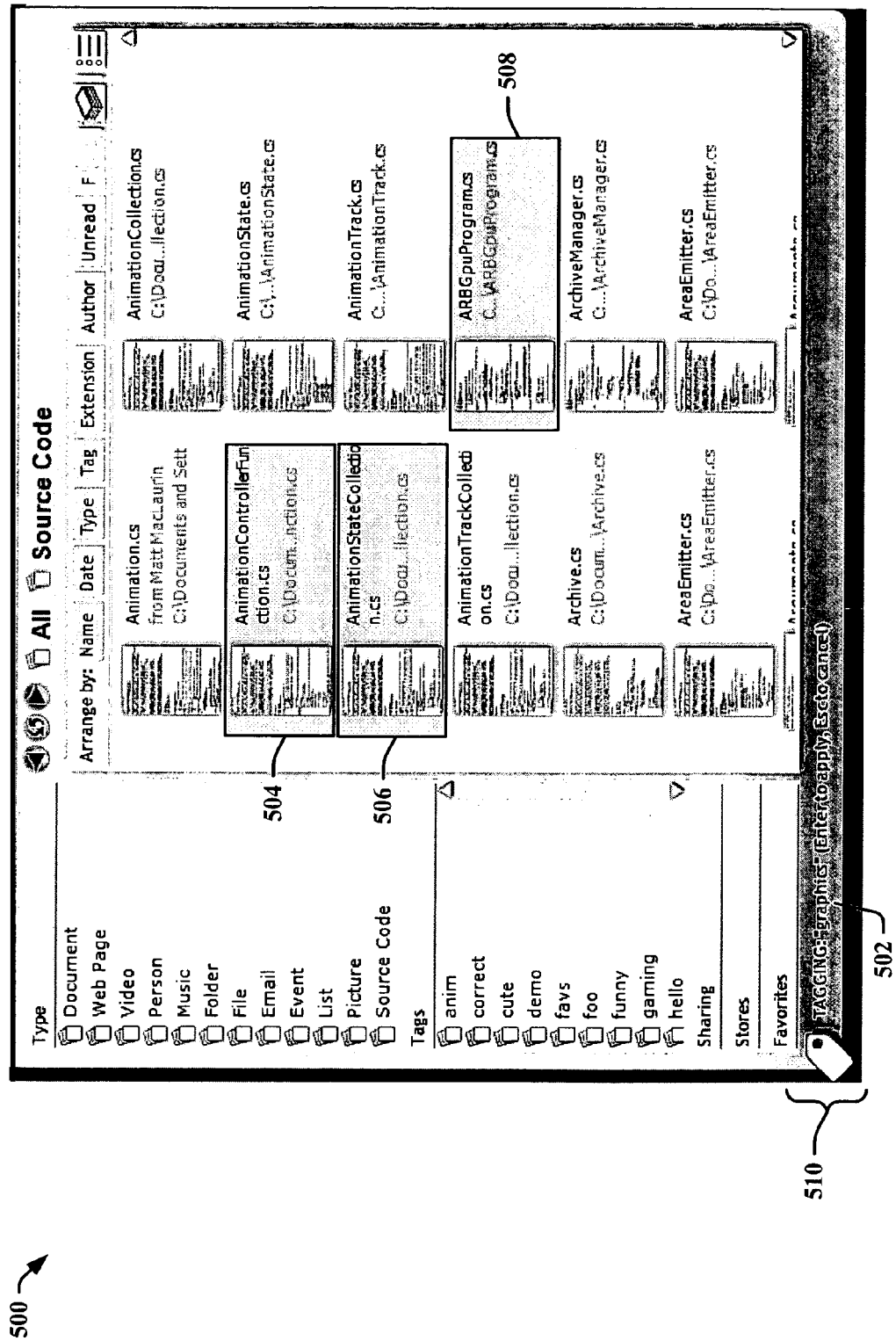
FIG. 5 is an illustration of a user interface with a tag input by a user for selected items in accordance with an aspect of an embodiment.
Figure 6:
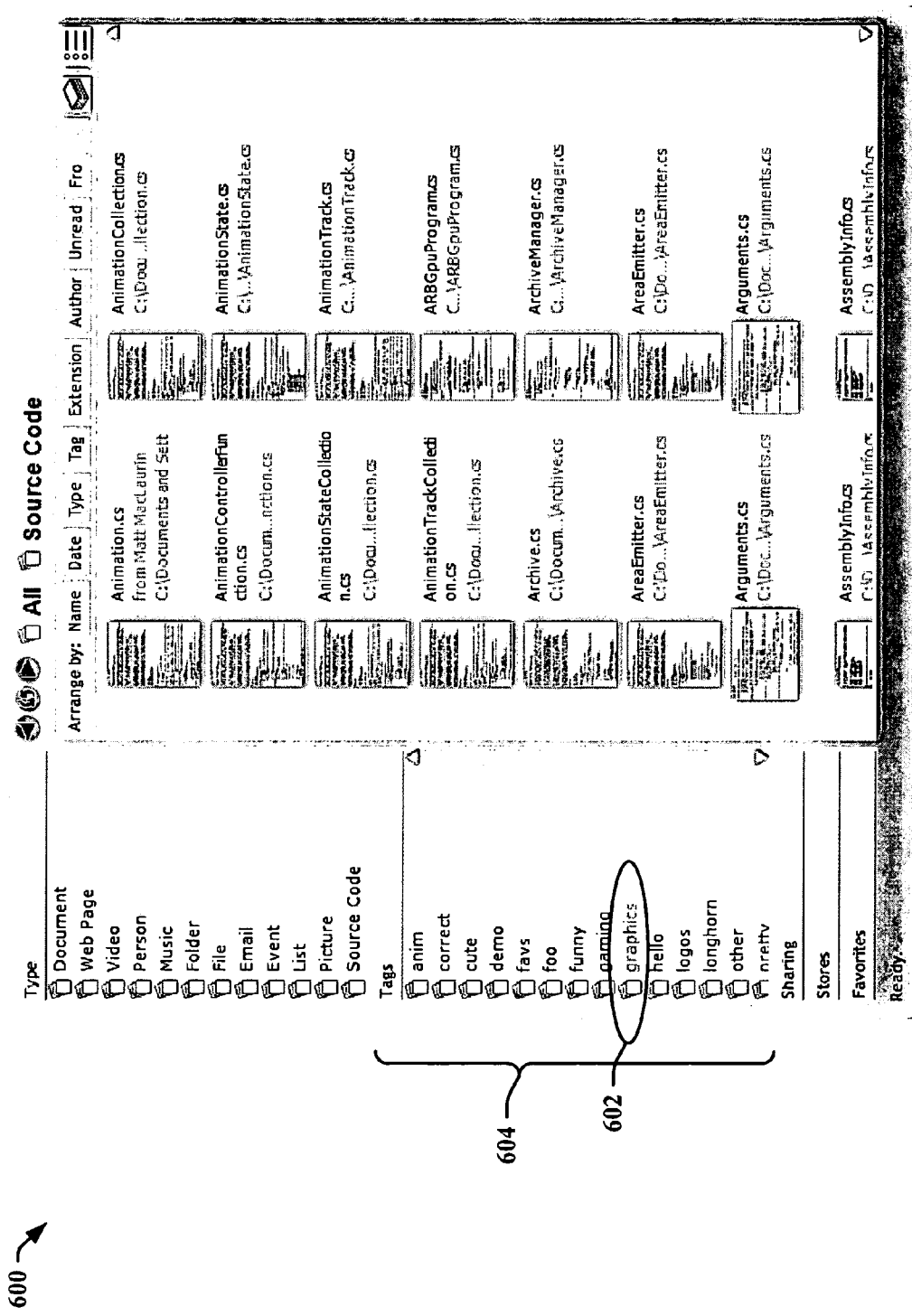
FIG. 6 is an illustration of a user interface showing a user input tag added to an item tag list in accordance with an aspect of an embodiment.
Figure 7:
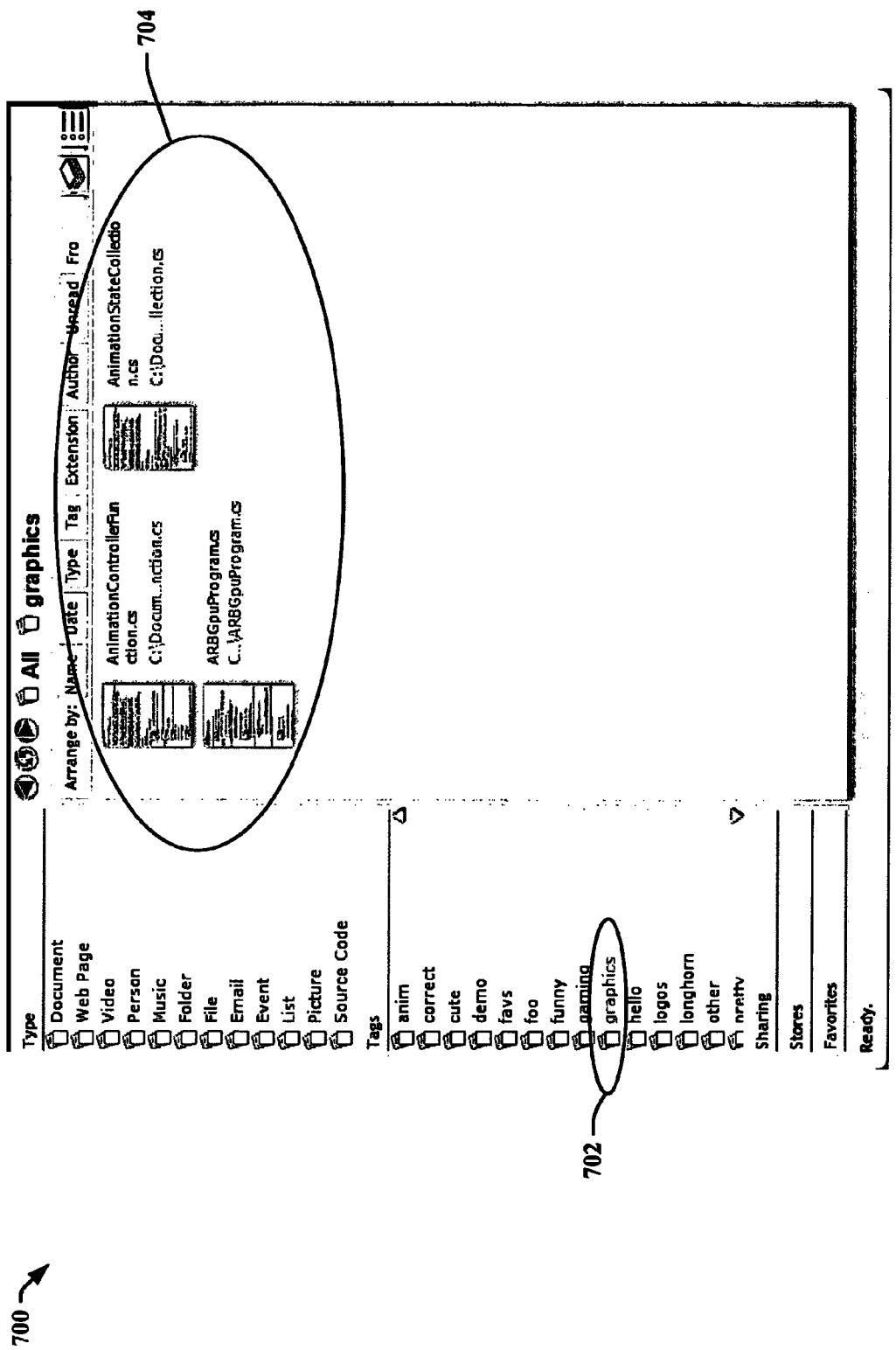
FIG. 7 is an illustration of a user interface displaying items with a specific item tag in accordance with an aspect of an embodiment.
Figure 8:
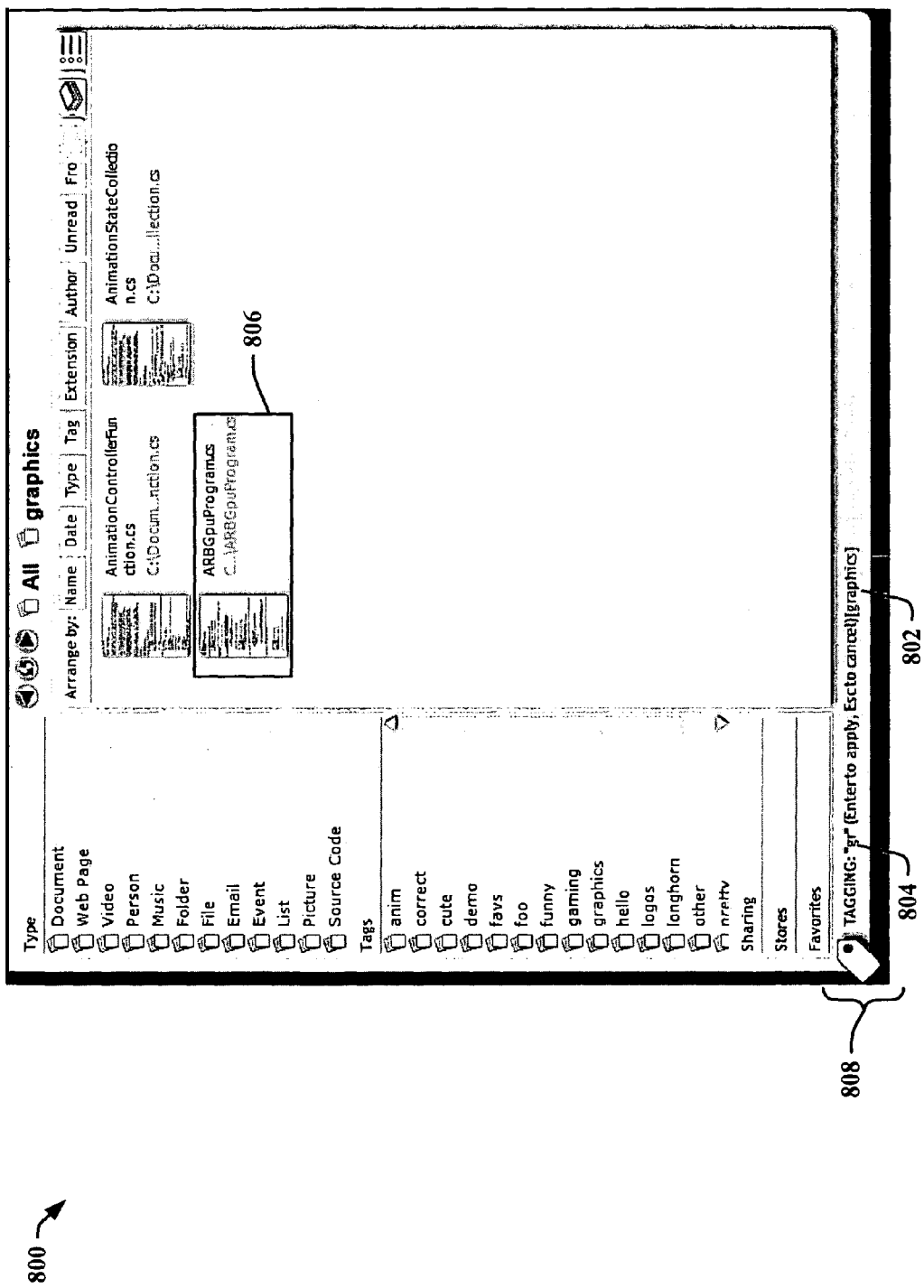
FIG. 8 is an illustration of a user interface with a suggested tag in response to a user input in accordance with an aspect of an embodiment.

Additional examples of user interfaces are shown in FIGS. 4-8 and facilitate to illustrate the ease at which a user can tag selected items. FIG. 4 shows a user interface 400 with selected items 402-406. The user interface 400 has a window 410 that allows a user to select items and another window 408 that shows tags already created. In this example, a user has selected three items 402-406 that they would like to tag. In FIG. 5, a user interface 500 with a tag 502 input by a user for selected items 504-508 are illustrated. The tag 502 is "graphics" and the user input is marked by an icon 510 to indicate to the user that tagging is occurring. For this example, the user has typed "graphics" and when the enter key is pressed on the keyboard, the tag 502 is associated with the selected items 504-508. For FIG. 6, a user interface 600 depicts a user input tag 602 added to an item tag list 604 after a user has entered and/or selected the tag 602 for a selection of items (not shown). The tag list 604 allows the user to quickly find items associated with the tags in the list. FIG. 7 shows a user interface 700 displaying items 704 with a specific item tag 702, namely "graphics." Thus, the user has selected a tag 702 from the tag list, and the resulting associated items 704 are then displayed to the user. FIG. 8 depicts a user interface 800 with a suggested tag "graphics" 802 in response to a user input "gr" 804 for a selected item 806. In this example, the user has typed the letters "gr" on a keyboard and a suggested tag has been provided based on that user input, namely "graphics." A tagging icon 808 is also displayed during the process to notify the user that a tagging process is occurring.

Figure 9:
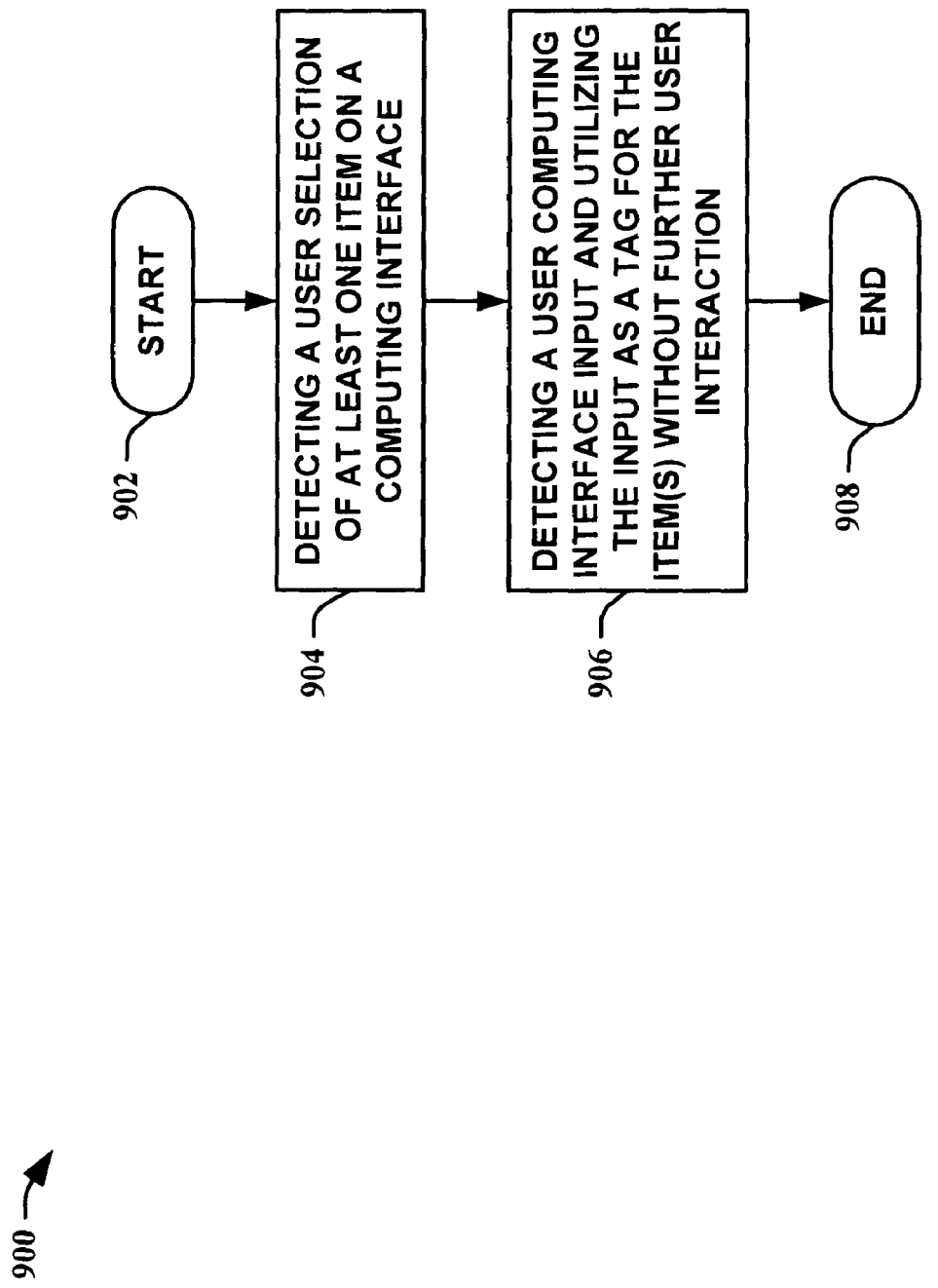
FIG. 9 is a flow diagram of a method of facilitating item tagging in accordance with an aspect of an embodiment.
Figure 10:
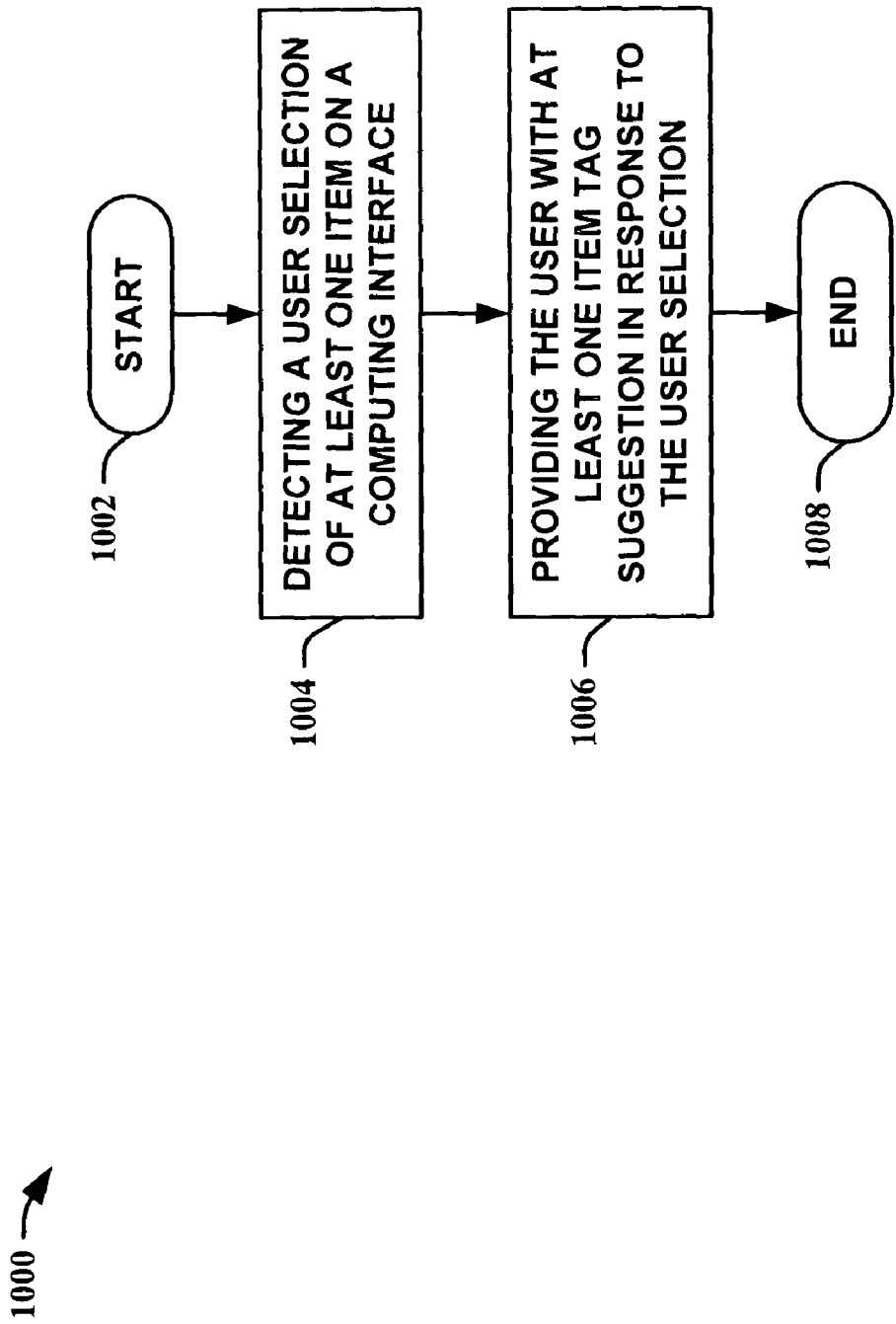
FIG. 10 is another flow diagram of a method of facilitating item tagging in accordance with an aspect of an embodiment.
Figure 11:
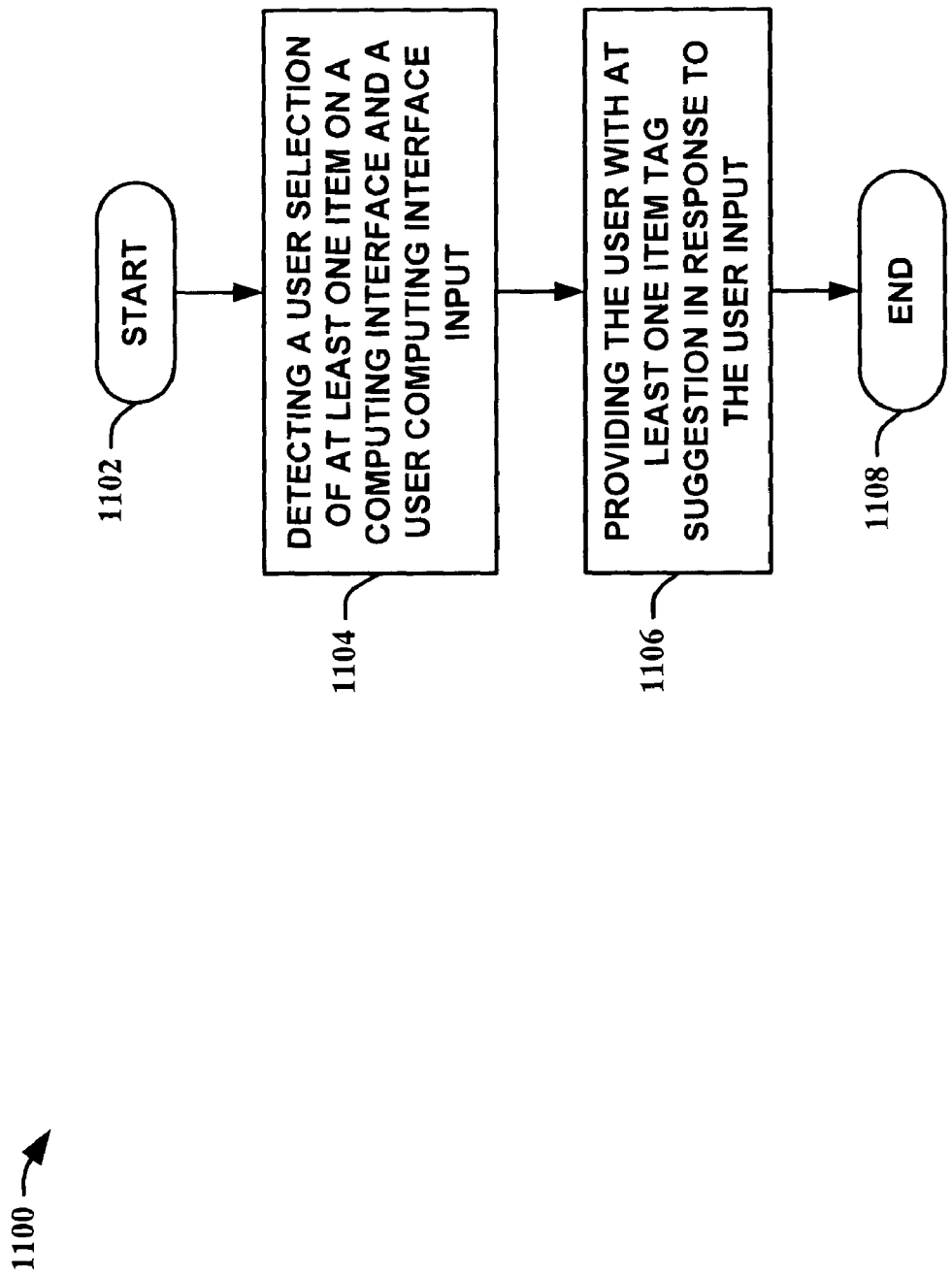
FIG. 11 is yet another flow diagram of a method of facilitating item tagging in accordance with an aspect of an embodiment.

In view of the exemplary systems shown and described above, methodologies that may be implemented in accordance with the embodiments will be better appreciated with reference to the flow charts of FIGS. 9-11. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

In FIG. 9, a flow diagram of a method 900 of facilitating item tagging in accordance with an aspect of an embodiment is shown. The method 900 starts 902 by detecting a user selection of at least one item on a computing interface 904. The user selection can be achieved, for example, by clicking and dragging a pointing device over an item or set of items, by utilizing verbal (audible) commands to select, and/or by utilizing visual cueing such as eye movement detection devices and the like. A user computing interface input is then detected, and the input is utilized as a tag for the item(s) without the necessity of further user interaction 906, ending the flow 908. This allows for quick and easy tagging without costly and time consuming interruptions of the user. It is also intuitive and does not require a lengthy learning curve for proper utilization. The input can be, for example, keystrokes from a keyboard and/or another type of input device and the like. This permits a user to select, type, and tag quickly.

Referring to FIG. 10, another flow diagram of a method 1000 of facilitating item tagging in accordance with an aspect of an embodiment is depicted. The method 1000 starts 1002 by detecting a user selection of at least one item on a computing interface 1004. The user selection can be achieved, for example, by clicking and dragging a pointing device over an item or set of items, by utilizing verbal (audible) commands to select, and/or by utilizing visual cueing such as eye movement detection devices and the like. The user is then provided with at least one item tag suggestion in response to the user selection 1006, ending the flow 1008. By automatically providing a tag suggestion in response to a selection, new and/or duplicate tags can be avoided and/or better tags can be found easily. This helps to prevent a user from using a tag called "home" one day and then a tag called "house" the next day, etc. The suggested tag can also be associated tags to make a user aware of several possible choices.

Looking at FIG. 11, yet another flow diagram of a method 1100 of facilitating item tagging in accordance with an aspect of an embodiment is illustrated. The method 1100 starts 1102 by detecting a user selection of at least one item on a computing interface and a user computing interface input 1104. Typically, the input is subsequent to the user selection so that the association can be made that the input relates to the selection. However, it is possible to provide an input and then associate it with a subsequent item selection. Although this technique is unlikely, it is still within the scope of the subject matter disclosed herein. The user is then provided with at least one item tag suggestion in response to the user input 1106, ending the flow 1108. The tag suggestion is typically dynamically generated as the input is obtained. For example, tag suggestions are provided as a user types characters on a keyboard as the input. The more characters, the more focused the tag suggestions become. This facilitates a user in speeding up the process of finding appropriate tags for the selected items with minimal user impact.

Figure 12:
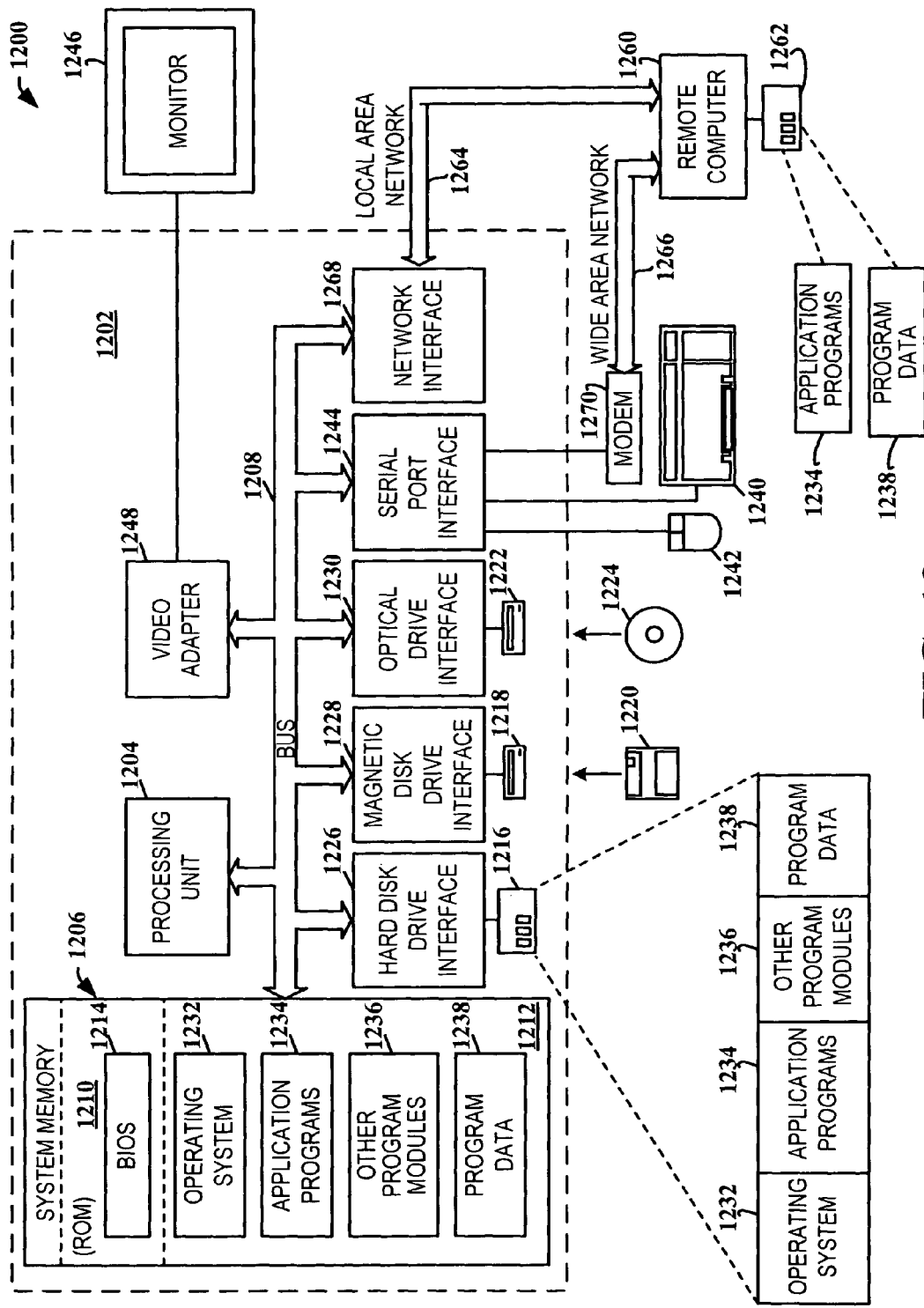
FIG. 12 illustrates an example operating environment in which an embodiment can function.

In order to provide additional context for implementing various aspects of the embodiments, FIG. 12 and the following discussion is intended to provide a brief, general description of a suitable computing environment 1200 in which the various aspects of the embodiments may be implemented. While the embodiments have been described above in the general context of computer-executable instructions of a computer program that runs on a local computer and/or remote computer, those skilled in the art will recognize that the embodiments may also be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, handheld computing devices, microprocessor-based and/or programmable consumer electronics, and the like, each of which may operatively communicate with one or more associated devices. The illustrated aspects of the embodiments may also be practiced in distributed computing environments where certain tasks are performed by remote processing devices that are linked through a communications network. However, some, if not all, aspects of the embodiments may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 12, an exemplary system environment 1200 for implementing the various aspects of the embodiments include a conventional computer 1202, including a processing unit 1204, a system memory 1206, and a system bus 1208 that couples various system components, including the system memory, to the processing unit 1204. The processing unit 1204 may be any commercially available or proprietary processor. In addition, the processing unit may be implemented as multi-processor formed of more than one processor, such as may be connected in parallel.

The system bus 1208 may be any of several types of bus structure including a memory bus or memory controller, a peripheral bus, and a local bus using any of a variety of conventional bus architectures such as PCI, VESA, Microchannel, ISA, and EISA, to name a few. The system memory 1206 includes read only memory (ROM) 1210 and random access memory (RAM) 1212. A basic input/output system (BIOS) 1214, containing the basic routines that help to transfer information between elements within the computer 1202, such as during start-up, is stored in ROM 1210.

The computer 1202 also may include, for example, a hard disk drive 1216, a magnetic disk drive 1218, e.g., to read from or write to a removable disk 1220, and an optical disk drive 1222, e.g., for reading from or writing to a CD-ROM disk 1224 or other optical media. The hard disk drive 1216, magnetic disk drive 1218, and optical disk drive 1222 are connected to the system bus 1208 by a hard disk drive interface 1226, a magnetic disk drive interface 1228, and an optical drive interface 1230, respectively. The drives 1216-1222 and their associated computer-readable media provide nonvolatile storage of data, data structures, computer-executable instructions, etc. for the computer 1202. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1200, and further that any such media may contain computer-executable instructions for performing the methods of the embodiments.

A number of program modules may be stored in the drives 1216-1222 and RAM 1212, including an operating system 1232, one or more application programs 1234, other program modules 1236, and program data 1238. The operating system 1232 may be any suitable operating system or combination of operating systems. By way of example, the application programs 1234 and program modules 1236 can include an item tagging scheme in accordance with an aspect of an embodiment.

A user can enter commands and information into the computer 1202 through one or more user input devices, such as a keyboard 1240 and a pointing device (e.g., a mouse 1242). Other input devices (not shown) may include a microphone, a joystick, a game pad, a satellite dish, a wireless remote, a scanner, or the like. These and other input devices are often connected to the processing unit 1204 through a serial port interface 1244 that is coupled to the system bus 1208, but may be connected by other interfaces, such as a parallel port, a game port or a universal serial bus (USB). A monitor 1246 or other type of display device is also connected to the system bus 1208 via an interface, such as a video adapter 1248. In addition to the monitor 1246, the computer 1202 may include other peripheral output devices (not shown), such as speakers, printers, etc.

It is to be appreciated that the computer 1202 can operate in a networked environment using logical connections to one or more remote computers 1260. The remote computer 1260 may be a workstation, a server computer, a router, a peer device or other common network node, and typically includes many or all of the elements described relative to the computer 1202, although for purposes of brevity, only a memory storage device 1262 is illustrated in FIG. 12. The logical connections depicted in FIG. 12 can include a local area network (LAN) 1264 and a wide area network (WAN) 1266. Such networking environments are commonplace in offices, enterprise-wide computer networks, intranets and the Internet.

When used in a LAN networking environment, for example, the computer 1202 is connected to the local network 1264 through a network interface or adapter 1268. When used in a WAN networking environment, the computer 1202 typically includes a modem (e.g., telephone, DSL, cable, etc.) 1270, or is connected to a communications server on the LAN, or has other means for establishing communications over the WAN 1266, such as the Internet. The modem 1270, which can be internal or external relative to the computer 1202, is connected to the system bus 1208 via the serial port interface 1244. In a networked environment, program modules (including application programs 1234) and/or program data 1238 can be stored in the remote memory storage device 1262. It will be appreciated that the network connections shown are exemplary and other means (e.g., wired or wireless) of establishing a communications link between the computers 1202 and 1260 can be used when carrying out an aspect of an embodiment.

In accordance with the practices of persons skilled in the art of computer programming, the embodiments have been described with reference to acts and symbolic representations of operations that are performed by a computer, such as the computer 1202 or remote computer 1260, unless otherwise indicated. Such acts and operations are sometimes referred to as being computer-executed. It will be appreciated that the acts and symbolically represented operations include the manipulation by the processing unit 1204 of electrical signals representing data bits which causes a resulting transformation or reduction of the electrical signal representation, and the maintenance of data bits at memory locations in the memory system (including the system memory 1206, hard drive 1216, floppy disks 1220, CD-ROM 1224, and remote memory 1262) to thereby reconfigure or otherwise alter the computer system's operation, as well as other processing of signals. The memory locations where such data bits are maintained are physical locations that have particular electrical, magnetic, or optical properties corresponding to the data bits.

Figure 13:
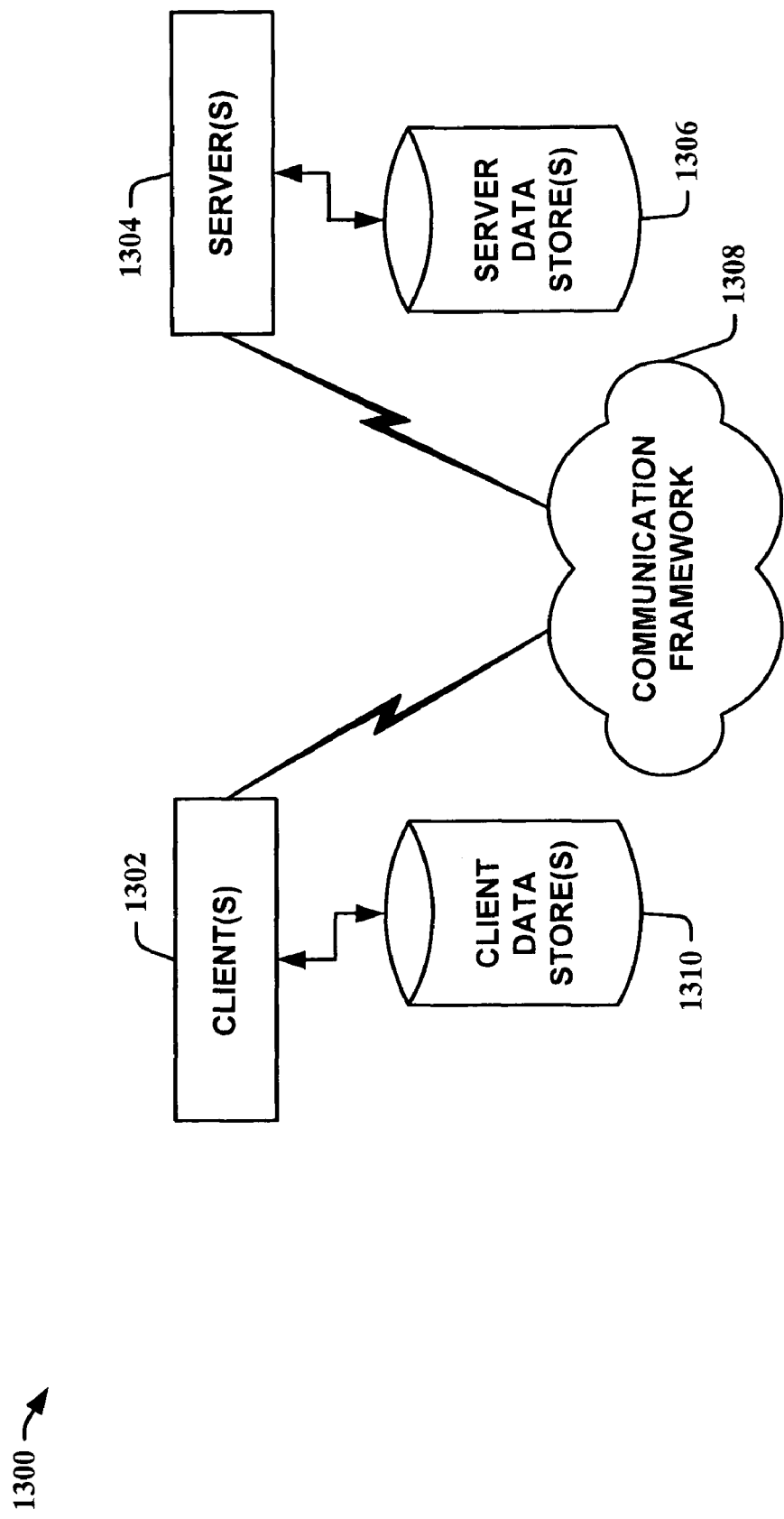
FIG. 13 illustrates another example operating environment in which an embodiment can function.

FIG. 13 is another block diagram of a sample computing environment 1300 with which embodiments can interact. The system 1300 further illustrates a system that includes one or more client(s) 1302. The client(s) 1302 can be hardware and/or software (e.g., threads, processes, computing devices). The system 1300 also includes one or more server(s) 1304. The server(s) 1304 can also be hardware and/or software (e.g., threads, processes, computing devices). One possible communication between a client 1302 and a server 1304 may be in the form of a data packet adapted to be transmitted between two or more computer processes. The system 1300 includes a communication framework 1308 that can be employed to facilitate communications between the client(s) 1302 and the server(s) 1304. The client(s) 1302 are connected to one or more client data store(s) 1310 that can be employed to store information local to the client(s) 1302. Similarly, the server(s) 1304 are connected to one or more server data store(s) 1306 that can be employed to store information local to the server(s) 1304.

It is to be appreciated that the systems and/or methods of the embodiments can be utilized in item tagging facilitating computer components and non-computer related components alike. Further, those skilled in the art will recognize that the systems and/or methods of the embodiments are employable in a vast array of electronic related technologies, including, but not limited to, computers, servers and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-readable storage medium having stored thereon computer-executable components of a system that facilitates tagging of computerized data, the system comprising:

a graphical user interface having a window to display information regarding at least one file of a file system and including at least one element of a graphical user interface that, when the window is in a tagging state, displays information regarding at least one suggested tag that may be applied to at least one first file, wherein the window enters into the tagging state upon detecting a selection of the at least one first file by the user and detecting at least one user input corresponding to successive characters of a tag that is desired to be applied to the at least one first file, wherein the window enters into the tagging state without requiring the user to enter a separate user interface or to provide user inputs other than the user inputs corresponding to the successive characters of the tag desired to be applied to the at least one first file; and a tagging component to provide dynamically, when the window enters the tagging state, the at least one suggested tag to the user via the window in response to the at least one user input, the at least one suggested tag being suggested based on, at least in part, the user input, and to associate at least one first tag with the at least one first file upon selection of the at least one first tag by the user.

2. The computer-readable storage medium of claim 1, the tagging component dynamically provides the at least one suggested tag in response to one or more successive keyboard keystrokes respectively corresponding to the successive characters of the tag desired to be applied to the at least one first file as provided by the user as user input subsequent to selection of the at least one first file.

3. The computer-readable storage medium of claim 1, wherein the tagging component heuristically determines the at least one suggested tag based on at least one of a first file of the at least one first file, a tag associated with a file similar to the at least one first file, a recently-utilized tag, a commonly-used tag, a rule-based criterion, or a heuristic-based criterion.

4. The computer-readable storage medium of claim 1, wherein the tagging component employs machine learning to determine the at least one suggested tag.

5. The computer-readable storage medium of claim 1, wherein the tagging component employs at least one external source to facilitate in determining the at least one suggested tag.

6. The computer-readable storage medium of claim 1, wherein the tagging component employs user data to determine the at least one suggested tag.

7. A method for facilitating tagging of computerized data, the method comprising:

operating at least one programmed processor to carry out a series of acts identified by executable instructions with which the at least one programmed processor is programmed, the series of acts comprising:

detecting a selection by a user of at least one file via a computing interface having a graphical window to display information about contents of a file system, the contents comprising the at least one file;

detecting one or more inputs corresponding to successive characters of a tag desired to be applied to at least one first file;

activating a tagging mode for the graphical window upon detecting the user selection and the one or more inputs without requiring any user action other than the user selection and the one or more inputs corresponding to successive characters of the tag to be applied to at least one first file, wherein the graphical window includes at least one element of a user interface that, when the graphical window is in the tagging mode, displays information regarding suggested tags that may be applied to the at least one first file; and in response to activation of the tagging mode:
determining at least one local suggested tag from at least one local data store of tags;

retrieving a set of tags from at least one external data store of tags based on at least one characteristic of the at least one first file, the at least one external data store of tags being different from the at least one local data store of tags;

determining at least one external suggested tag from the set of tags; and automatically providing, via the at least one element of the user interface of the graphical window, the at least one local suggested tag and the at least one external suggested tag to the user as the suggested tags for the at least one first file.

8. The method of claim 7 further comprising:
relaying an indication to the user via the computing interface, upon activation of the tagging mode, that the tagging mode is activated.

9. The method of claim 7 further comprising:
dynamically providing the at least one local suggested tag and/or the at least one external suggested tag for the at least one first file to the user via the computing interface in response to the one or more inputs by repeating the acts of determining based on additional inputs provided by the user.

10. The method of claim 9 further comprising:
heuristically determining the at least one local suggested tag based on one or more of a selected file of the at least one first file, a tag associated with a similar file, a recently-utilized tag, a commonly-used tag, a rule-based criterion, or a heuristic-based criterion.

11. The method of claim 9 further comprising:
employing machine learning to facilitate in determining the at least one local suggested tag and/or the at least one external suggested tag.

12. The method of claim 9 further comprising:
accumulating the one or more inputs into a buffer as they are successively detected; and
utilizing the buffer to facilitate in determining the at least one local suggested tag and/or the at least one external suggested tag for the at least one first file.

13. The method of claim 9 further comprising:
relaying an indication of a current optimal suggested tag to the user via the computing interface.

14. A computer-readable storage medium having stored thereon computer-executable components of a system that facilitates tagging of computerized data, the system comprising:

a user interface having a graphical window that interacts with a user to facilitate display of information regarding at least one file of a file system and selection of at least one first file of the at least one file, wherein when the graphical window of the user interface detects a selection of at least one file by the user and an input of successive keyboard keystrokes from the user corresponding to successive characters of a tag desired to be applied to the at least one first file, the graphical window enters a tagging state and displays, via at least one element of the graphical window, information regarding at least one suggested tag that may be applied to the at least one first file;

a component that, upon triggering of the tagging state, determines the at least one suggested tag for the at least one first file based at least in part on the successive keyboard keystrokes from the user, a common characteristic of the at least one first file, and a characteristic of the user and provides the at least one suggested tag to the at least one element of the graphical window for display; and a tagging component that applies one or more tags selected by the user to the at least one first file.

15. The computer-readable storage medium of claim 1, further comprising a tag reconciliation component that obtains one or more tags from a plurality of respective users at disparate computing devices and reconciles the tag sets corresponding to respective users to create a common tag set for the plurality of users based on the obtained tags.

16. The computer-readable storage medium of claim 1, further comprising a component that stores the at least one suggested tag provided by the tagging component and one or more explicit tags provided by the user.

17. The computer-readable storage medium of claim 16, further comprising a component that assigns a first confidence level to respective suggested tags and a second confidence level to respective explicit tags, wherein the window of the graphical user interface displays an indication of confidence levels applied to tags associated with the at least one first file.

18. The computer-readable storage medium of claim 5, wherein the tagging component provides the at least one suggested tag from a formal taxonomy obtained from the at least one external source based on context information relating to the user.

19. The method of claim 7, wherein the series of acts further comprises:
   determining at least one user characteristic relating to the user, and
   wherein retrieving the set of tags from the at least one external data store of tags based on at least one characteristic comprises retrieving the set of tags based on the at least one characteristics of the at least one file and the at least one user characteristic.

20. The computer-readable storage medium of claim 14, wherein the characteristic of the user is at least one of an identity property of the user, a type of work engaged in by the user, and a current project on which the user is working.

* * * * *